(12) United States Patent
Lee

(10) Patent No.: US 7,487,764 B2
(45) Date of Patent: Feb. 10, 2009

(54) PRE-IGNITION FUEL TREATMENT SYSTEM

(76) Inventor: Dennis Lee, 3002 Route 23 North, Newfoundland, NJ (US) 07435

( * ) Notice: Subject to any disclaimer, the term of this patent is extended or adjusted under 35 U.S.C. 154(b) by 0 days.

(21) Appl. No.: 11/889,226

(22) Filed: Aug. 10, 2007

(65) Prior Publication Data
US 2008/0041350 A1 Feb. 21, 2008

Related U.S. Application Data

(60) Provisional application No. 60/837,924, filed on Aug. 16, 2006.

(51) Int. Cl.
F02M 31/18 (2006.01)
(52) U.S. Cl. ..................................................... 123/538
(58) Field of Classification Search ......... 123/536–538, 123/543–557
See application file for complete search history.

(56) References Cited

U.S. PATENT DOCUMENTS

| | | | |
|---|---|---|---|
| 4,014,777 A * | 3/1977 | Brown | |
| 4,015,567 A * | 4/1977 | Zabenskie | |
| 4,074,670 A * | 2/1978 | Roberts et al. | |
| 4,081,656 A * | 3/1978 | Brown | |
| 4,158,346 A * | 6/1979 | Roberts et al. | |
| 4,527,533 A * | 7/1985 | Laramee | |
| 4,841,943 A * | 6/1989 | Favreau et al. | |
| 4,846,137 A * | 7/1989 | Ray | |
| 4,984,555 A * | 1/1991 | Huang | |
| 5,118,451 A * | 6/1992 | Lambert, Sr. et al. | |
| 5,794,601 A * | 8/1998 | Pantone | 123/538 |
| 6,123,742 A * | 9/2000 | Smith | |
| 6,311,648 B1 * | 11/2001 | Larocque | |
| 7,021,249 B1 * | 4/2006 | Christison | |
| 7,104,224 B2 * | 9/2006 | Jonson | 123/3 |
| 7,143,722 B2 * | 12/2006 | Ross | |
| 7,194,984 B2 * | 3/2007 | Jonson | 123/1 A |
| 2001/0003276 A1* | 6/2001 | De Souza et al. | |

* cited by examiner

*Primary Examiner*—M. McMahon
(74) *Attorney, Agent, or Firm*—Thomas J. Germinario

(57) ABSTRACT

A method and apparatus for reforming a hydrocarbon fuel which increases the efficiency with which said fuel's energy content may be extracted resulting in improved combustibility and reduction of by-products produced. The hydrocarbon fuel is cracked and ionized in a reactor vessel by means of a feedback loop of electro-chemical interactions with a reactor rod comprised of materials which are both magnetic and catalytic.

22 Claims, 2 Drawing Sheets

PRE-IGNITION FUEL TREATMENT SYSTEM

CROSS-REFERENCES TO RELATED APPLICATIONS

This application claims the benefit of the filing date of provisional application 60/837,924, filed Aug. 16, 2006.

BACKGROUND OF THE INVENTION

This invention relates to a system for improving the combustion efficiency of internal combustion engines.

The present invention improves combustion efficiency and reduces polluting combustion by-products of internal combustion engines by reforming the hydrocarbon fuel to render it more readily and completely combustible. This is accomplished by a pre-ignition fuel treatment system in which large, complex hydrocarbon molecules are "cracked" or broken down into smaller, simpler molecules. These simpler hydrocarbons are more readily combustible and produce fewer combustion by-products. Reformed or "cracked" hydrocarbons are also rich in ions and free radicals, which are highly reactive and hence highly combustible. Hydrocarbon "cracking" is a highly endothermic reaction, which means it requires a large amount of energy to complete the reaction. Therefore, hydrocarbon cracking must take place under conditions of high temperature and high pressure. The cracking process is facilitated by the presence of a catalyst.

The present invention takes advantage of the high temperature, high pressure environment of the engine's exhaust gases to create a reaction zone in which the hydrocarbon molecules of the fuel are cracked. The hydrocarbon cracking reaction is facilitated by the insertion into the reaction zone of an iron rod. Under the high temperature conditions of the reaction zone, the surface of the iron rod becomes oxidized. It is known that iron oxides act as catalysts for various hydrocarbon cracking processes, as for example, in the hydrocarbon reforming processes taught by Setzer, et al., U.S. Pat. No. 4,451,578. As ionized fuel molecules and atoms are produced during the cracking process, moreover, their motion around the rod generates an electromagnetic field which magnetizes the iron in the rod. As the iron rod itself magnetizes, the rod generates its own magnetic field, which further ionizes the fuel and accelerates the motion of the ionized particles. These accelerated ions then generate a still stronger electromagnetic field, which in turn induces even greater magnetism in the iron rod. Thus, the electrical-magnetic interaction of the ionized fuel and the iron rod becomes a feedback loop that drives the process toward ever greater ionization until the fuel is transformed into a plasma.

The prior art contains two patents which teach the use of a reactor rod in pre-ignition reformation of hydrocarbon fuel. These are Pantone, U.S. Pat. No. 5,794,601, and Jonson, U.S. Pat. No. 7,194,984. While both of these patents have superficial similarities to the present invention, they are both riddled with technical misconceptions which lead to fatal design flaws. In Pantone, a hydrocarbon fuel is volatilized and the vapor is drawn through a thermal preheater mounted inside an engine exhaust pipe. The thermal preheater is configured as a reactor tube having a reactor rod mounted concentrically within it, so that the vapor flows through an annular plenum around the rod. The downstream side of the reactor tube is pneumatically connected to the engine's intake manifold, such that the partial vacuum of the intake manifold extends through the reactor tube and draws the fuel vapor into the intake manifold.

Although the inventor of this apparatus speculates that some type of molecular cracking takes place in the reactor tube, he candidly admits to being clueless as what is taking place and why. While the inventor has apparently stumbled upon some things that work, he stumbles over some other things that don't. He states, for example, that the composition of the reactor rod is of no consequence, and he asserts that even a generic ceramic reactor rod will do (4:35-39). But if the reactor rod serves no catalytic function, then the supposed "cracking" process must be purely thermal cracking, which requires an extremely elevated level of temperature and pressure far above the range found in automobile exhaust.

And, in fact, the inventor's own observations confirm that no cracking takes place in his reactor tube, but instead the volatized fuel is partially combusted. The inventor relates that his reactor tube becomes quite a bit hotter than could be attributed to the heat transfer from the exhaust gases (5:25-43). This means that an exothermic reaction—one that releases heat—is taking place. Cracking is an endothermic reaction—one that absorbs heat. It follows that the Pantone apparatus does not render the fuel more combustible by cracking it, but instead renders it less combustible by partially burning it in the reactor tube.

The reason that the performance of Pantone's apparatus is indifferent to the composition of the reactor rod is that he makes the annular plenum between the reactor rod and the reactor tube too large. The patent specifies a range of 0.035-0.04 inches for this annular plenum (6:6-9), which is more than twice as wide as what is needed. A much more constricted annular plenum is necessary for two reasons: (1) to bring more fuel molecules into direct contact with the surface of the reactor rod, so as to maximize the electro-chemical interaction between the rod and the fuel, and (2) to accelerate the fuel molecules, thereby increasing their kinetic energy to a level at which molecular cracking can occur. On the other hand, the wider annular plenum in Pantone's reactor tube is more conducive to the partial combustion process which, unbeknownst to the inventor, is actual going on there.

In the Jonson patent, we have another instance of an inventor groping in the dark because he doesn't understand the underlying science. Consequently, although Jonson corrects some of Pantone's errors, he goes on to make some errors of his own which equally frustrate the purpose of the invention. While Jonson baldly asserts that his treated fuel has "characteristics of a cold plasma" (3:6-7), it becomes clear from reading the specification that he has no idea what a "plasma" actually is. Unable to credibly claim that his process yields an actual plasma, in the scientific sense of that word, Jonson creates his own totally circular definition: "the term plasma fuel as used herein is simply used as a title to refer to fuel produced as described herein" (3:9-11). In other words, the treated fuel is "plasma", provided that "plasma" is defined to mean the treated fuel.

Unfortunately for Jonson, the enormity of his logical fallacies is matched by that of his technical fallacies. According to his specification, fuel enters one end of his reactor tube as liquid droplets and exits the other end as plasma (3:32-39). Since plasma is an ionized vapor, a liquid can only become a plasma if is first vaporized and then ionized. Yet Jonson's "plasma fuel" is neither ionized nor vaporized. In fact, the patent asserts that cavitation of the "plasma fuel" occurs in a low pressure area of the reactor tube (4:10-15), which necessarily implies that the "plasma fuel" remains in a liquid state, since cavitation can only occur in a liquid. And the patent claims clearly designate the "plasma fuel" as being in a liquid state, since they repeatedly describe the final step of the patented process as "introducing the droplets to the combustion process" (8:35, 9:10, 9:28, 9:51, 10:1, 10:18, 10:36, 10:59).

Although the Jonson patent states an unsupported belief that the treated fuel is provided to the engine "in a significant state of ionization", it describes no process by which such ionization can occur. Moreover, since the treated fuel remains in a liquid state, the only way it can be "ionized" (loosely speaking) is in the sense that its droplets acquire an electrical charge. But electrically charged liquid fuel droplets are no more combustible than electrically neutral droplets. Ionization must occur at the molecular-atomic level in order to affect chemical reactivity and combustion characteristics of the fuel.

While Jonson, unlike Pantone, gets it right in requiring that the reactor rod be a magnetic material and specifying a narrowly constrained annular plenum between the reactor rod and reactor tube, he still finds other ways to go wrong. His specification calls for lowering the temperature inside the reactor tube, even to the extent of using refrigeration (3:56-65, 12:22-23). The specification also calls for reducing the pressure within the reactor tube to 250 mmHg (less than one-third of atmospheric), even using a vacuum generator to that end (5:45-48, 6:7-10, 8:18-20, 8:5-63). Both of these features completely negate any potential for hydrocarbon cracking to occur in Jonson process, since cracking requires high temperature and high pressure.

Jonson's disclosure superficially resembles the present invention insofar as it uses the magnetic field induced in the reactor rod and the constrained annular plenum in the reactor tube to accelerate the fuel flow around the reactor rod. But the big difference is in what is being accelerated in each case. The Jonson process is designed to accelerate liquid droplets of fuel (see claims 1-3). But acceleration of liquid droplets has no effect on molecular energy within the droplets, and hence contributes nothing to the chemical reformation of the fuel hydrocarbons which is the ostensible goal of the process. In the present invention, on the other hand, it is the ionized molecules of the fuel that are accelerated, and this has the immediate effect of increasing molecular kinetic energy and temperature, thereby inducing molecular cracking of the fuel hydrocarbons.

The most important distinction between the present invention and the Pantone and Jonson patents is the total absence in the prior art reactor rods of a catalytic material. Without such a catalyst, hydrocarbon cracking simply cannot occur in the temperature range of engine exhaust gases. Consequently, the prior art fails to disclose an apparatus and process capable of cracking hydrocarbon fuel and converting it into a genuine plasma so as to truly improve the fuel's combustibility and increase the overall combustion efficiency of the internal combustion engine in which the fuel is burned. As will now be explained in some detail herein, the present invention offers precisely these capabilities.

SUMMARY OF THE INVENTION

It is an object of the present invention to create a reaction zone in a motor vehicle wherein the hydrocarbon fuel is reformed at high temperature and pressure, such that large hydrocarbon molecules are "cracked" to produce smaller, more readily combustible molecules.

It is another object of the present invention to crack the hydrocarbon fuel molecules in such a manner as to generate plentiful free radicals and ions, which are highly reactive and hence highly combustible.

It is a further object of the present invention to take advantage of the high temperature, high pressure environment of the engine's exhaust gases by locating the reaction zone within the exhaust pipe, such that some of the energy of exhaust gases is transferred to the fuel molecules and helps induce molecular cracking.

It is yet another object of the present invention to create a reaction zone containing a reactor rod composed of a material having catalytic properties, such that the reactor rod acts as a catalyst to promote the hydrocarbon cracking process and to enable that process to take place at a lower temperature and pressure than would otherwise be feasible.

It is yet a further object of the present invention to utilize a reactor rod composed of a material that also has magnetic properties, such that when ions from the cracking process flow around the reactor rod, the rod becomes magnetized and generates a magnetic field which interacts with ionized hydrocarbon molecules, causing them to accelerate.

It is still another object of the present invention to create in the reaction zone a positive feedback loop between the magnetization of the reactor rod and the acceleration of the hydrocarbon molecules, such that the accelerated motion of the ionized molecules induces a progressively stronger magnetism in the rod, which in turn generates a stronger magnetic field that further accelerates the molecules.

It is still a further object of the present invention to utilize the electromagnetic feedback loop created in the reactor zone to accelerate the hydrocarbon fuel molecules to such an elevated energy level that the fuel is transformed into a gaseous plasma.

These and other beneficial objects are achieved by a process in which a reaction zone is established in within the outflow of exhaust gases downstream of the exhaust manifold of an internal combustion engine. The reaction zone comprises a reactor vessel that is installed within the exhaust pipe, such that the exhaust gases flow around the reactor vessel on all sides. Within a reactor enclosure is a reactor rod, which is axially positioned within the reactor vessel such that a uniform annular plenum is formed between the surface of the reactor rod and the walls of the reactor enclosure. The reactor rod is centrally located along the length of the reactor vessel, and it is composed of a material that has both catalytic and magnetic properties.

On the distal end of the reactor vessel (i.e., the end furthest from the exhaust manifold) is an injection assembly, comprising one or more fuel injection ports and one or more air injection ports. The fuel injection ports are hydraulically connected to a fuel line, through which a hydrocarbon fuel flows from a fuel tank. The air injection ports are pneumatically connected to the external atmosphere through an air inlet. At the proximal end of the reactor vessel (i.e., the end closest to the exhaust manifold), is a vacuum conduit which pneumatically connects the reactor vessel to the engine's intake manifold at a location downstream of the throttle plate, thereby creating a pressure drop from the distal end to the proximal end of the reactor vessel. This pressure drop draws fuel and air through the injection assembly, then through the reactor vessel from the distal end to the proximal end, and then into the vacuum conduit. From the vacuum conduit, the fuel-air mixture is drawn into the intake manifold and from there into the engine cylinders where it is combusted.

The fuel-air mixture flows within the reactor vessel in the opposite direction to the flow of exhaust gases around the reactor enclosure. At the distal end of this cross-flow process, the fuel-air mixture is heated by the exhaust gases to a temperature at which the fuel is completely vaporized. The vaporized fuel-air mixture then encounters the reactor rod at its distal end, which has a convex shape to promote laminar flow around it. As the vaporized fuel-air mixture enters the annular plenum around the reactor rod, its flow path becomes constricted, which causes its pressure and velocity to increase. The increased pressure and kinetic energy of the vaporized fuel-air mixture is further augmented by its absorption of thermal energy from the exhaust gases, which are becoming progressively hotter as the exhaust manifold is approached.

As the temperature and pressure of the vaporized fuel-air mixture becomes progressively elevated, some of the vaporized fuel molecules reach a sufficient energy to undergo catalytic cracking reactions at the surface of the reactor rod. The cracking reactions produce ionized molecules, the motion of which generates an electromagnetic field around the reactor rod, and this electromagnetic field magnetizes the reactor rod itself. As the reactor rod becomes magnetized, it generates its own magnetic field which causes the motion of the ionized fuel molecules to accelerate. The accelerated motion of the ionized fuel molecules has two effects. First, the accelerated ionic flow generates a stronger electromagnetic field around the reactor rod, which causes the reactor rod to become more strongly magnetized, which then further accelerates the ionic flow. Second, the accelerated flow increases the kinetic energy of the fuel molecules, thereby increasing the temperature and pressure of the vaporized fuel, so that an increasing number of molecules undergo catalytic cracking along the surface of the reactor rod.

As more fuel molecules crack, more ions are produced and their increasing number and acceleration generates a progressively stronger electromagnetic field around the reactor rod. This strengthening electromagnetic field, in turn, progressively increases the magnetization of the rod. The progressively stronger magnetic field generated by the reactor rod then further accelerates the molecular flow, further increasing the kinetic energy of the molecules and causing more of them to crack and ionize Thus, a positive feedback loop is established which drives the hydrocarbon molecules to progressively higher kinetic energy levels. This is an endothermic process that increasingly draws energy from the cross-flow of exhaust gases as those gases become hotter toward the proximal end of the reactor vessel. This positive feedback loop continues until the vaporized fuel-air mixture reaches the proximal end of the reactor rod and has been ionized to a degree corresponding to the physical state known as plasma.

The plasma of cracked fuel and air then passes through the proximal end of the reaction vessel and into the vacuum conduit. From there it enters the intake manifold below the throttle plate and is drawn into the engine cylinders where it is combusted. Since the cracked plasma is much more chemically reactive than un-cracked non-plasma fuel, its combustion releases more energy per unit of fuel and leaves fewer combustion by-products as potential air pollutants.

DETAILED DESCRIPTION OF THE PREFERRED EMBODIMENT

Figure 1:
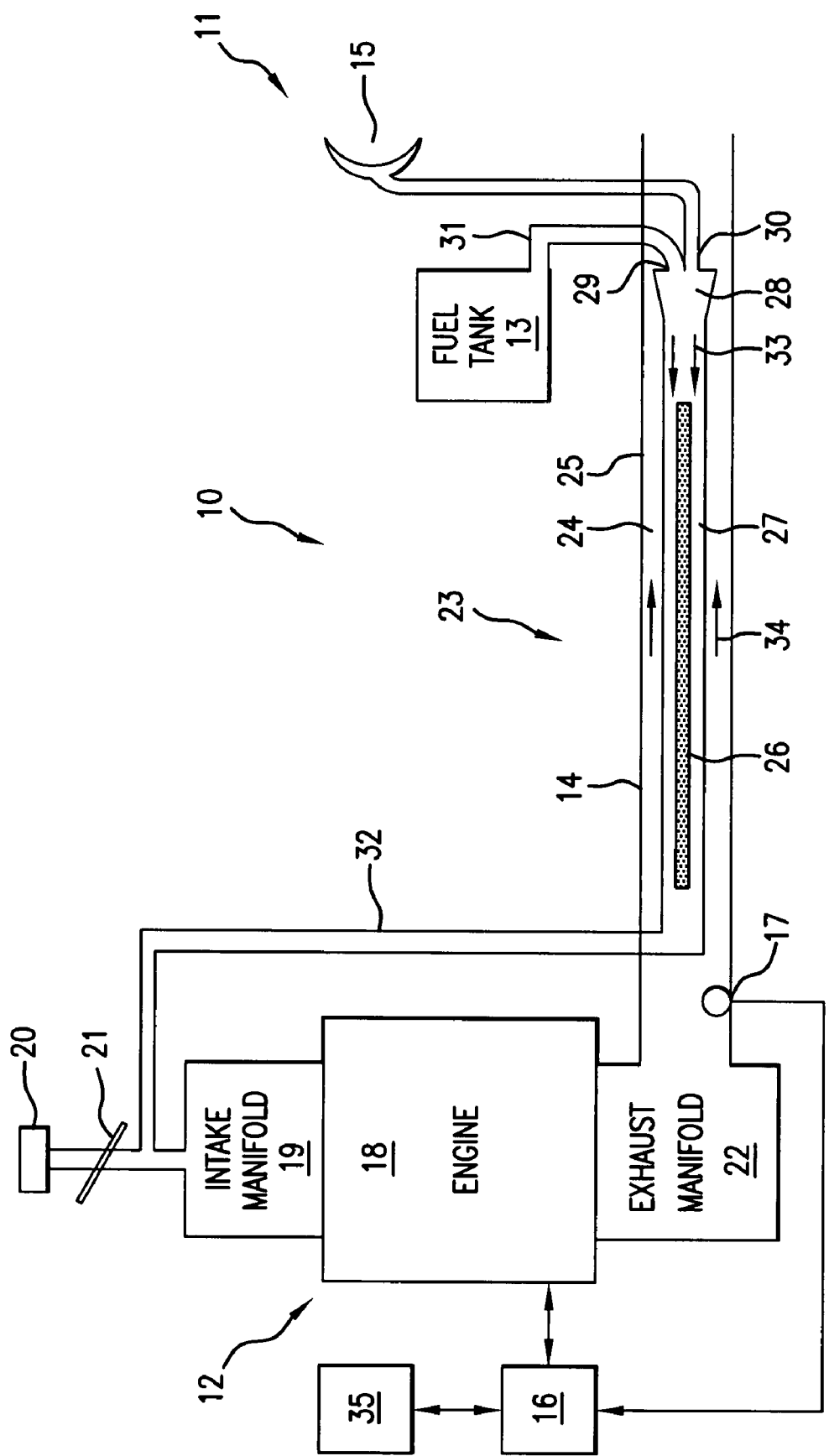
FIG. 1 is a schematic diagram of the pre-ignition fuel treatment system according to the preferred embodiment of the present invention.

Referring to FIG. 1, a pre-ignition fuel treatment system 10 is installed in a motor vehicle 11 having an internal combustion engine 12, a fuel tank 13, an exhaust pipe 14, an air inlet 15, an engine control module (ECM) 16, and one or more engine/emissions sensors 17. The fuel tank 12 stores a hydrocarbon fuel that is mixed with air to make a fuel-air mixture 33 that is combusted in the engine 12. Optionally, water or steam can also be added to the fuel-air mixture 33. Combustion by-products and excess air, collectively referred to as exhaust gases 33, exit from the vehicle to the external atmosphere through an exhaust pipe 14. The engine/emissions sensors 17 monitor the air-to-fuel ratio and/or the amount of oxygen in the exhaust gases 34.

The engine 12 comprises a plurality of cylinders 18, an intake manifold 19, an air filter 20, a throttle plate 21, and an exhaust manifold 22. In the cylinders 18 the fuel-air mixture 33 is combusted and the exhaust gases 34 are expelled into the exhaust manifold 22, which then expels the exhaust gases 34 into the exhaust pipe 14. The cylinders 18 move with a reciprocating action that has the effect of creating a partial vacuum in the intake manifold 19, which draws air from the external atmosphere into the engine 12 through an air filter 20. The amount of air drawn into the intake manifold 19 is regulated by a throttle plate 21 that is located between the air filter 20 and the intake manifold 19. The throttle plate 21 is a butterfly valve that opens wider as the vehicle operator depresses the gas pedal. The opening of the throttle plate 21 is controlled by the ECM 16, which is a microprocessor that computes the optimal air-to-fuel ratio based on the readings of the engine/emissions sensors 17.

Figure 2:
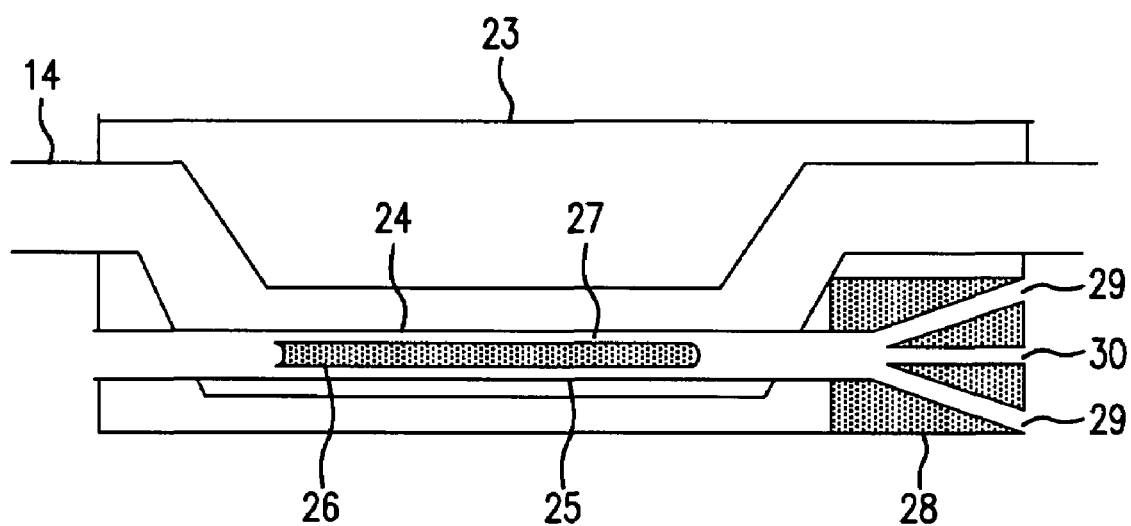
FIG. 2 is a cross-sectional view of the reaction zone with the reactor vessel installed in an exhaust pipe according to the preferred embodiment of the present invention.

Referring now to both FIG. 1 and FIG. 2, the present invention 10 establishes a reaction zone 23 in the exhaust pipe 14 by inserting into a section of the exhaust pipe 14 a reactor vessel 24. The reactor vessel 24 is an oblong plenum formed by a rigid reactor enclosure 25, which is non-contiguously affixed to the exhaust pipe 14. In the preferred embodiment 10, the reactor vessel 24 is a tubular structure fabricated of a material having a high thermal conductivity that can withstand a high temperature, high pressure environment. The reactor vessel 24 is axially installed within the exhaust pipe 14 such that the exhaust gases 34 flow around the entire perimeter of the reactor vessel 24. In the preferred embodiment 10, the longitudinal axis of the reactor vessel 24 is aligned with that of the section of exhaust pipe 14 into which it is inserted.

In addition to the reactor enclosure 25, the reactor vessel 24 comprises a reactor rod 26, an annular plenum 27, and an injection assembly 28. The reactor rod 26 is an elongated cylindrical structure axially positioned within the reactor enclosure 25, such that the annular plenum 27 formed between the reactor rod 26 and the reactor enclosure 25 is of uniform width. In the preferred embodiment, the width of the annular plenum 27 is approximately 0.015 inches, and the diameter of the reactor rod 26 is approximately 0.856 inches. Optionally, the reactor rod 26, may have a slightly tapered diameter in the midsection of the rod, tapering down to a diameter of approximately 0.732 inches. The length of the reactor rod 26 is in the range of 4 to 10 inches, depending on the size of the engine 12.

The material composition of the reactor rod 26 is crucial importance to the process of cracking the hydrocarbon fuel and transforming it into a plasma. The reactor rod 26 must serve the dual roles of providing a catalyst for the cracking process and participating in the "feedback loop" electromagnetic interaction with ionized fuel molecules, as described hereinabove, which drives the fuel-air mixture 33 toward a plasma state. In order to fulfill both of these roles, the reactor rod 26 must contain materials that are both highly magnetic and good catalysts for the hydrocarbon cracking process.

While the preferred embodiment 10 uses an iron reactor rod 26, other suitable material are steel, nickel, cobalt, rare-earth metals, alloys of the foregoing metals, and magnetic ceramics. Nickel, cobalt and rare-earth metals have known applications as catalysts in hydrocarbon cracking, as disclosed in Cornelius et al., U.S. Pat. No. 4,101,376, Sie, U.S. Pat. No. 4,579,986, and Kumar et al., U.S. Pat. No. 5,248,642, respectively. The reactor rod 26 can also consist of a magnetic core with a catalytic coating or plating. For example, a reactor rod 26 with a steel core covered by a layer of platinum plating is also suitable.

The shape of the reactor rod 26 is also plays an important role in the cracking and plasma-formation processes. The distal end of the reactor rod 26 (i.e., the end furthest from the exhaust manifold 22) has a convex shape, so that the flow of the fuel-air mixture 33 around the end of the rod is laminar. The goal in forcing the fuel-air mixture 33 into the constrained annular plenum 27 is to accelerate the flow rate and thereby increase the velocity and kinetic energy of the fuel molecules so that some of them will attain the energy level needed for cracking to begin. Therefore, turbulent flow around the reactor rod 26 is to be avoided, since turbulence dissipates the molecular kinetic energy and thus retards the cracking process. Accordingly, the proximal end of the reactor rod 26 (i.e., the end closest to the exhaust manifold 22) has a concave shape, which has the effect of creating an area of reduced pressure downstream of the reactor rod 26. This area of reduced pressure has the effect of drawing the flow of fuel-air mixture 33 evenly along the surface of the reactor rod 26, so that energy-dissipating areas of turbulent flow are avoided.

On the distal end of the reactor vessel 24 is the injection assembly 28, comprising one or more fuel injection ports 29 and one or more air injection ports 30. The fuel injection ports are hydraulically connected to a fuel line 31, through which the hydrocarbon fuel flows from the fuel tank 13. The air injection ports 30 are pneumatically connected to the external atmosphere through the air inlet 15. At the proximal end of the reactor vessel 24, is a vacuum conduit 32, which pneumatically connects the reactor vessel 24 to the engine's intake manifold 19 at a location downstream of the throttle plate 21, thereby creating a pressure drop from the distal end to the proximal end of the reactor vessel 24. This pressure drop draws fuel and air (and, optionally, water or steam) through the injection assembly 28, then through the reactor vessel 24 from the distal end to the proximal end, and then into the vacuum conduit 32. From the vacuum conduit 32, the fuel-air mixture 33 is drawn into the intake manifold 19 and from there into the engine cylinders 18 where it is combusted.

The location at which the vacuum conduit connects to the intake manifold is very important to maintaining a constant pressure drop across the reactor vessel 24. In the prior art cited hereinabove, this connection is made upstream of the throttle plate 21. Consequently, in the prior art systems, the pressure drop across the reactor is variable, becoming much diminished when the throttle plate is closed during engine idling or downhill coasting. For this reason, the prior art systems both have a tendency to stall during idling, because the diminished pressure drop is no longer sufficient to draw the fuel-air mixture through the reactor. In the present invention 10, on the other hand, the vacuum conduit 32 connects to the intake manifold 19 downstream of the throttle plate 21, such that the pressure drop across the reactor vessel 24 remains constant.

The flow direction of fuel-air mixture 33 through the reactor vessel 24 is in the opposite direction to the flow direction the exhaust gases 34 through the exhaust pipe 14, thus creating a cross-flow that optimizes the transfer to thermal energy from the exhaust gases 34 to the fuel-air mixture 33. As the fuel-air mixture 33 is drawn into the reactor enclosure 25 through the injector assembly 28, the cross-flow heats the fuel-air mixture to the point at which the fuel component is vaporized. As the vaporized fuel-air mixture 33 enters the annular plenum 27 around the reactor rod 26, its flow path becomes constricted, which causes its pressure and velocity to increase. The increased pressure and kinetic energy of the vaporized fuel-air mixture 33 is further augmented by its absorption of thermal energy from the exhaust gases, which are becoming progressively hotter as the cross-flow approaches the exhaust manifold 22.

As the fuel-air mixture 33 flows through the annular plenum 27, it undergoes the process of cracking and plasma-formation described hereinabove. The cracked plasma fuel then is drawn into the intake manifold 19 through the vacuum conduit 32. At this juncture, the engine control module (ECM) 16 will determine how far to open the throttle plate 21, thereby making the air-to-fuel ratio either richer (lower ratio) or leaner (higher ratio). Since, the ECM 16 bases its determination of air-to-fuel ratio on the stoichiometry of conventional fuel (gasoline or diesel) combustion, its operations must be modified to account for the higher energy content of the cracked plasma fuel generated by the present invention 10. Therefore, the preferred embodiment of the present invention 10 includes an auxiliary microprocessor 35, which interfaces with the ECM 16 so as to adjust the air-to-fuel ratio to reflect the stoichiometry of cracked plasma fuel combustion.

An example will illustrate the need for the auxiliary microprocessor 35. Because of the higher energy content of the cracked plasma fuel, less of it will be consumed to release the same amount of energy as conventional fuel. Therefore, its combustion will consume less oxygen, causing the concentration of oxygen in the exhaust gases 34 to rise. This rise will be reflected in the readings of the engine/emissions sensors 17 and communicated to the ECM 16. Since the ECM 16 does its calculations based on the energy content of conventional fuel, its normal response would be to infer from the rise in oxygen concentration in the exhaust gases that the air-to-fuel ratio is too lean. Therefore, the ECM 16 standing alone would, under the circumstances of this example, signal the engine 12 to increase the concentration of fuel being sent to the cylinders 18. In so doing, however, the ECM 16 would undo the fuel economy advantage of the cracked plasma. When the auxiliary microprocessor 35 interfaces with the ECM 16, however, the air-to-fuel ratio is adjusted to account for the higher energy content of the cracked plasma fuel, thus enabling the present invention 10 to achieve real savings in fuel consumption.

While this invention has been described with reference to a specific embodiment, the description is not to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments that fall within the true scope of this invention.

What is claimed is:

1. A method of treating hydrocarbon fuel comprising:
   (a) creating a reaction zone within a flow of exhaust gases from an internal combustion engine;
   (b) inserting within the reaction zone a reactor vessel having a proximal end and a distal end, which reactor vessel comprises a reactor enclosure, an injection assembly, a reactor rod, and an annular plenum, wherein the reactor rod is an elongated rod composed of a magnetic catalyst material, or a combination of magnetic and catalytic materials, and wherein the reactor rod is axially disposed within the reactor enclosure and is separated from the reactor enclosure by the annular plenum, and wherein the injector assembly is located at the distal end of the reactor vessel;

(c) establishing a pressure differential between within the reactor vessel, such that the pressure at the proximal end is less than the pressure at the distal end;

(d) introducing into the injection assembly a fuel-air mixture, which is a mixture of a fuel component composed of hydrocarbon molecules and an air component, such that the pressure differential draws the fuel-air mixture through the reactor vessel from the distal end to the proximal end;

(e) establishing a cross-flow between the exhaust gases and the fuel-air mixture, wherein the exhaust gases flow around the reactor enclosure from the proximal end to the distal end, while the fuel-air mixture flows within the reactor enclosure from the distal end to the proximal end;

(f) transferring thermal energy from the exhaust gases to the fuel-air mixture by means of the cross-flow, such that the rate of thermal energy transfer increases with the increasing temperature of the exhaust gases as the fuel-air mixture flows toward the proximal end of the reactor vessel;

(g) vaporizing the fuel component of the fuel-air mixture with the thermal energy transferred from the exhaust gases as the fuel-air mixture flows toward the annular plenum;

(h) drawing the fuel-air mixture into the annular plenum by means of the pressure differential, and thereby creating a constricted flow, in which the flow velocity, temperature and pressure of the fuel-air mixture increases, and the hydrocarbon molecules of the fuel component attain an elevated energy level;

(i) initiating a cracking of the hydrocarbon molecules of the fuel component at the elevated energy level at which cracking occurs in the presence of the reactor rod acting as a catalyst;

(j) producing from the cracking a plurality of free radicals and ions along with non-ionized molecules of the fuel component, such that the ions and the non-ionized molecules interact with one another in the constricted flow of the fuel-air mixture, and energy is transferred back and forth between the ions and the non-ionized molecules;

(k) generating from the constricted flow of the ions an electromagnetic field in and around the reactor rod, thereby magnetizing the reactor rod and causing the reactor rod to develop a magnetic field that exerts a force on the ions;

(l) accelerating the ions by the effect of the force exerted on the ions by the magnetic field, such that the strength of the electromagnetic field is augmented, and such that the kinetic energy of the ions is increased, with some of the increased energy of the ions being transferred to the non-ionized molecules, an increasing proportion of which undergo cracking by attaining the elevated energy level at which cracking occurs in the presence of the reactor rod;

(m) establishing a positive feedback loop in which the electromagnetic field generated by the ions and the magnetic field generated by the reactor rod progressively strengthen each other, thereby progressively increasing the kinetic energy of the hydrocarbon molecules, such that cracking and ionization the fuel component proceeds to the point that the fuel-air mixture becomes a plasma and constitutes a plasma fuel having an enhanced energy content; and (n) combusting the plasma fuel in an internal combustion engine.

2. The method according to claim 1, wherein the reactor rod is composed of a material selected from the group consisting of iron, iron alloy, steel, steel alloy, nickel, nickel alloy, cobalt, cobalt alloy, rare-earth metals, rare-earth metal alloys, and catalytic magnetic ceramic.

3. The method according to claim 1, wherein the reactor rod comprises a core and an outer layer, such that the core consists of a magnetic material and the outer layer consists of a catalytic material.

4. The method according to either of claims 2 or 3, wherein the reactor road has a distal end which is convex and a proximal end which is concave.

5. The method according to claim 4, wherein the reactor rod is an elongated cylinder.

6. The method according to claim 4, wherein the reactor rod is an elongated cylinder with a tapered midsection.

7. The method according to claim 5, comprising the additional step, prior to combusting the plasma fuel in an internal combustion engine, of diluting the plasma fuel with air in an air-to-fuel ratio as determined by an engine control module interfacing with an auxiliary microprocessor, such that the auxiliary microprocessor adjusts the air-to-fuel ratio to account for the enhanced energy content of the plasma fuel.

8. The method according to claim 6, comprising the additional step, prior to combusting the plasma fuel in an internal combustion engine, of diluting the plasma fuel with air in an air-to-fuel ratio as determined by an engine control module interfacing with an auxiliary microprocessor, such that the auxiliary microprocessor adjusts the air-to-fuel ratio to account for the enhanced energy content of the plasma fuel.

9. The method according to claim 7, wherein the fuel-air mixture is a mixture of a fuel component, which is composed of hydrocarbon and water molecules, and an air component.

10. The method according to claim 8, wherein the fuel-air mixture is a mixture of a fuel component, which is composed of hydrocarbon and water molecules, and an air component.

11. A method of treating hydrocarbon fuel comprising:

(a) Creating a reaction zone within a flow of exhaust gases from an internal combustion engine;

(b) Inserting within the reaction zone a reactor vessel having a proximal end and a distal end, which reactor vessel comprises a reaction enclosure, an injection assembly, a reactor rod, and an annular plenum, wherein the reactor rod is an elongated rod, which by virtue of its composition is magnetic and has a surface which acts as a catalyst in hydrocarbon reformation reactions, which reactor rod has a distal end which is convex and a proximal end which is concave, and which reactor rod comprises a core and an outer layer, such that the core consists of a magnetic material and the outer layer consists of a material which is catalytic in hydrocarbon reformation reactions, and wherein the injection assembly is located at the distal end of the reactor vessel;

(c) Establishing a pressure differential within the reactor vessel, such that the pressure at the proximal end is less than the pressure at the distal end;

(d) introducing into the injection assembly a fuel-air mixture, which is a mixture of a fuel component composed of hydrocarbon molecules and an air component, such that the pressure differential draws the fuel-air mixture through the reactor vessel from the distal end to the proximal end;

(e) establishing a cross-flow between the exhaust gases and the fuel-air mixture, wherein the exhaust gases flow around the reactor enclosure from the proximal end to the distal end, while the fuel-air mixture flows within the reactor enclosure from the distal end to the proximal end;

(f) transferring thermal energy from the exhaust gases to the fuel-air mixture by means of the cross-flow, such that the rate of thermal energy transfer increases with the increasing temperature of the exhaust gases as the fuel-air mixture flows toward the proximal end of the reactor vessel;

(g) vaporizing the fuel component of the fuel-air mixture with the thermal energy transferred from the exhaust gases as the fuel-air mixture flows toward the annular plenum;

(h) drawing the fuel-air mixture into the annular plenum by means of the pressure differential, and thereby creating a constricted flow, in which the flow velocity, temperature and pressure of the fuel-air mixture increases, and the hydrocarbon molecules of the fuel component attain an elevated energy level;

(i) initiating a cracking of the hydrocarbon molecules of the fuel component at the elevated energy level at which cracking occurs in the presence of the reactor rod acting as a catalyst so as to produce a treated fuel;

(j) combusting the treated fuel in an internal combustion engine.

12. The method according to claim 11, wherein the reactor rod is an elongated cylinder.

13. The method according to claim 11, wherein the reactor rod is an elongated cylinder with a tapered midsection.

14. The method according to claim 12, comprising the additional step, prior to combusting the plasma fuel in an internal combustion engine, of diluting the plasma fuel with air in an air-to-fuel ratio as determined by an engine control module interfacing with an auxiliary microprocessor, such that the auxiliary microprocessor adjusts the air-to-fuel ratio to account for the enhanced energy content of the treated fuel.

15. The method according to claim 13, comprising the additional step, prior to combusting the treated fuel in an internal combustion engine, of diluting the treated fuel with air in an air-to-fuel ratio as determined by an engine control module interfacing with an auxiliary microprocessor, such that the auxiliary microprocessor adjusts the air-to-fuel ratio to account for the enhanced energy content of the treated fuel.

16. The method according to claim 14, wherein the fuel-air mixture is a mixture of a fuel component, which is composed of hydrocarbon and water molecules, and an air component.

17. The method according to claim 15, wherein the fuel-air mixture is a mixture of a fuel component, which is composed of hydrocarbon and water molecules, and an air component.

18. An apparatus for treating hydrocarbon fuel comprising:
(a) a reaction zone within an exhaust pipe of a motor vehicle, which reaction zone has axially disposed within it a reactor vessel;
(b) a reactor vessel having a proximal end and a distal end, which reactor vessel comprises a reactor enclosure, an injection assembly, a reactor rod, and an annular plenum, wherein the reactor rod by virtue of its composition is magnetic and has a surface which acts as a catalyst in hydrocarbon reformation reactions, and wherein the reactor rod has a distal end which is convex and a proximal end which is concave, and wherein the reactor rod is composed of a material selected from the group consisting of iron, iron alloy, steel, steel alloy, nickel, nickel alloy, cobalt, cobalt alloy, rare-earth metals, rare-earth metal alloys, and catalytic magnetic ceramic, and wherein the reactor rod is axially disposed within the reactor enclosure and is separated from the reactor enclosure by the annular plenum, and wherein the injector assembly is located at the distal end of the reactor vessel;
(c) a fuel-air mixture, or a fuel-water-air mixture, which flows into the reactor vessel from the injector assembly and then flows through the reactor vessel from the distal end to the proximal end, and which fuel-air mixture, or fuel-air-water mixture, undergoes a cracking and ionization process which transforms the fuel-air mixture, or fuel-air-water mixture, into a plasma constituting a plasma fuel having an enhanced energy content.

19. The apparatus according to claim 18, wherein the reactor rod is an elongated cylinder.

20. The apparatus according to claim 19, wherein the reactor rod is an elongated cylinder with a tapered midsection.

21. The apparatus according to claim 19, comprising the additional elements of an engine control module (ECM) digitally interfaced with an auxiliary microprocessor, such that the ECM in concert with the auxiliary microprocessor determines an air-to-fuel ratio which accounts for the enhanced energy content of the treated fuel.

22. The apparatus according to claim 20, comprising the additional elements of an engine control module (ECM) digitally interfaced with an auxiliary microprocessor, such that the ECM in concert with the auxiliary microprocessor determines an air-to-fuel ratio which accounts for the enhanced energy content of the treated fuel.

* * * * *